(12) United States Patent
Liu et al.

(10) Patent No.: US 10,690,837 B2
(45) Date of Patent: Jun. 23, 2020

(54) BACKLIST DISPLAYS WITH BENT LIGHT GUIDE LAYERS

(71) Applicant: Apple Inc., Cupertino, CA (US)

(72) Inventors: Rong Liu, Sunnyvale, CA (US); Mengyang Liang, Sunnyvale, CA (US); Yu P. Sun, San Jose, CA (US); Jun Qi, Cupertino, CA (US); Victor H. Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 15/265,361

(22) Filed: Sep. 14, 2016

(65) Prior Publication Data

US 2017/0363800 A1    Dec. 21, 2017

Related U.S. Application Data (60) Provisional application No. 62/352,640, filed on Jun. 21, 2016.

(51) Int. Cl.
| | | |
|---|---|---|
| *F21V 8/00* | (2006.01) | |
| *G02F 1/1335* | (2006.01) | |
| *G02F 1/133* | (2006.01) | |
| *G02F 1/13357* | (2006.01) | |

(52) U.S. Cl.
CPC ......... *G02B 6/0081* (2013.01); *G02B 6/0026* (2013.01); *G02F 1/13318* (2013.01); *G02F 1/1336* (2013.01); *G02F 2201/58* (2013.01)

(58) Field of Classification Search
CPC .... G02B 6/002; G02B 6/0011; G02F 2201/58
See application file for complete search history.

(56) References Cited

U.S. PATENT DOCUMENTS

| | | | |
|---|---|---|---|
| 5,808,708 A | 9/1998 | Oyama et al. | |
| 6,123,430 A * | 9/2000 | Ono | G02B 6/0055 362/23.15 |
| 7,543,973 B2 | 6/2009 | Shimura | |
| 7,812,900 B2 | 10/2010 | Hung et al. | |
| 8,049,839 B2 | 11/2011 | Han et al. | |
| 8,061,884 B2 | 11/2011 | Harbers et al. | |

(Continued)

FOREIGN PATENT DOCUMENTS

| | | |
|---|---|---|
| CN | 101308780 | 11/2008 |
| EP | 2336812 | 6/2011 |

(Continued)

*Primary Examiner* — Alexander K Garlen
*Assistant Examiner* — Eric T Eide
(74) *Attorney, Agent, or Firm* — Treyz Law Group, P.C.; G. Victor Treyz; David K. Cole (57) ABSTRACT

A display such as a liquid crystal display may have an array of pixels that is illuminated using backlight illumination from a backlight. The backlight may have a light guide layer that distributes light from light-emitting diodes across the display. The light guide layer may have a planar portion that provides backlight illumination to the array of pixels and may have bent edge portions that curve out of the plane of the planar portion. Light scattering structures may be formed in the planar portion to extract backlight illumination from the light guide layer. A light sensor adjacent to the bent portion may monitor leaked light. The light guide layer may have two bent portions on opposing edges of the light guide layer.

18 Claims, 11 Drawing Sheets

(56) References Cited

U.S. PATENT DOCUMENTS

| | | |
|---|---|---|
| 8,118,470 B2 | 2/2012 | Niu |
| 8,941,795 B2 | 1/2015 | Garelli et al. |
| 9,028,123 B2 * | 5/2015 | Nichol ................. G02B 6/0076 349/63 |
| 9,651,729 B2 * | 5/2017 | Nichol ................. G02B 6/0036 |
| 2001/0019479 A1 | 9/2001 | Nakabayashi |
| 2002/0141201 A1 | 10/2002 | Shimura et al. |
| 2003/0103729 A1 | 6/2003 | Ishida |
| 2003/0202336 A1 | 10/2003 | Ostergard et al. |
| 2006/0007702 A1 | 1/2006 | Hsieh et al. |
| 2006/0262554 A1 * | 11/2006 | Mok ..................... G02B 6/0031 362/555 |
| 2007/0058391 A1 | 3/2007 | Wilson et al. |
| 2007/0064417 A1 | 3/2007 | Hatanaka et al. |
| 2007/0102482 A1 | 5/2007 | Baleras et al. |
| 2007/0153539 A1 | 7/2007 | Mikami |
| 2007/0274098 A1 | 11/2007 | Wheatley et al. |
| 2008/0084707 A1 | 4/2008 | Blumstein et al. |
| 2008/0316603 A1 | 12/2008 | Jang et al. |
| 2009/0040786 A1 | 2/2009 | Mori |
| 2009/0167651 A1 | 7/2009 | Minano et al. |
| 2009/0290328 A1 * | 11/2009 | Ueyama ............... G02B 6/0028 362/97.3 |
| 2010/0097823 A1 | 4/2010 | Chang et al. |
| 2010/0118563 A1 | 5/2010 | Shen et al. |
| 2010/0123858 A1 | 5/2010 | Han et al. |
| 2010/0157619 A1 | 6/2010 | Chinniah et al. |
| 2010/0195022 A1 | 8/2010 | Shikii et al. |
| 2010/0265698 A1 | 10/2010 | Chen |
| 2010/0321953 A1 | 12/2010 | Coleman et al. |
| 2011/0002141 A1 | 1/2011 | Chang |
| 2011/0032729 A1 | 2/2011 | Duong et al. |
| 2011/0036693 A1 | 2/2011 | Lin et al. |
| 2011/0128255 A1 | 6/2011 | Feng et al. |
| 2011/0273645 A1 | 11/2011 | Medendorp, Jr. et al. |
| 2012/0287674 A1 * | 11/2012 | Nichol ................. G02B 6/0018 362/611 |
| 2013/0051076 A1 | 2/2013 | Mizuno et al. |
| 2013/0163278 A1 | 6/2013 | Wang et al. |
| 2013/0235611 A1 | 9/2013 | Franklin et al. |
| 2013/0322111 A1 * | 12/2013 | Nishitani ............. G02B 6/0028 362/603 |
| 2014/0133179 A1 * | 5/2014 | Franklin .............. G02B 6/0093 362/612 |
| 2015/0277179 A1 * | 10/2015 | Nishi ................... G02B 6/0088 349/58 |
| 2017/0153743 A1 * | 6/2017 | Kim ..................... G02B 6/0036 |

FOREIGN PATENT DOCUMENTS

| | | |
|---|---|---|
| JP | 2007-66719 | 3/2007 |
| JP | 2010-032923 | 2/2010 |
| JP | 2010-67390 | 3/2010 |
| KR | 10-2011-0057528 | 6/2011 |
| TW | 200848809 | 12/2008 |
| TW | 201102714 | 1/2011 |
| TW | 201122622 | 7/2011 |
| WO | 02/097324 | 12/2002 |

* cited by examiner

BACKLIST DISPLAYS WITH BENT LIGHT GUIDE LAYERS

This application claims the benefit of provisional patent application No. 62/352,640, filed Jun. 21, 2016, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Displays such as liquid crystal displays may include backlight units. A backlight unit may include a light source and a light guide for distributing light from the light source across the display.

It can be challenging to form a satisfactory backlight. If care is not taken, a backlight unit may consume more space than desired within an electronic device and may necessitate the use of relatively large display borders.

SUMMARY

A display such as a liquid crystal display may have an array of pixels that is illuminated using backlight illumination from a backlight. The backlight may have a light guide layer that distributes light from light-emitting diodes across the display.

The light guide layer may have a planar portion that provides backlight illumination to the array of pixels and may have a bent edge portion that curves out of the plane of the planar portion. Light scattering structures may be formed on the planar portion of the light guide layer to extract backlight illumination from the light guide layer. A light sensor adjacent to the bent portion may measure leaked light. These light measurements may be monitored to evaluate the color and intensity of backlight illumination.

The light guide layer may have two bent portions on opposing edges of the light guide layer. Bent portions may have a metal coating, may be adjacent to an air gap, and may be supported by elastomeric material. A light guide element may couple light from the light-emitting diodes into edge surfaces of the bent portions.

DETAILED DESCRIPTION

Electronic devices such as cellular telephones, computers, wristwatches, media players, televisions, and other electronic devices may include displays. The displays may be used to display images for a user and may be backlit.

Figure 1:
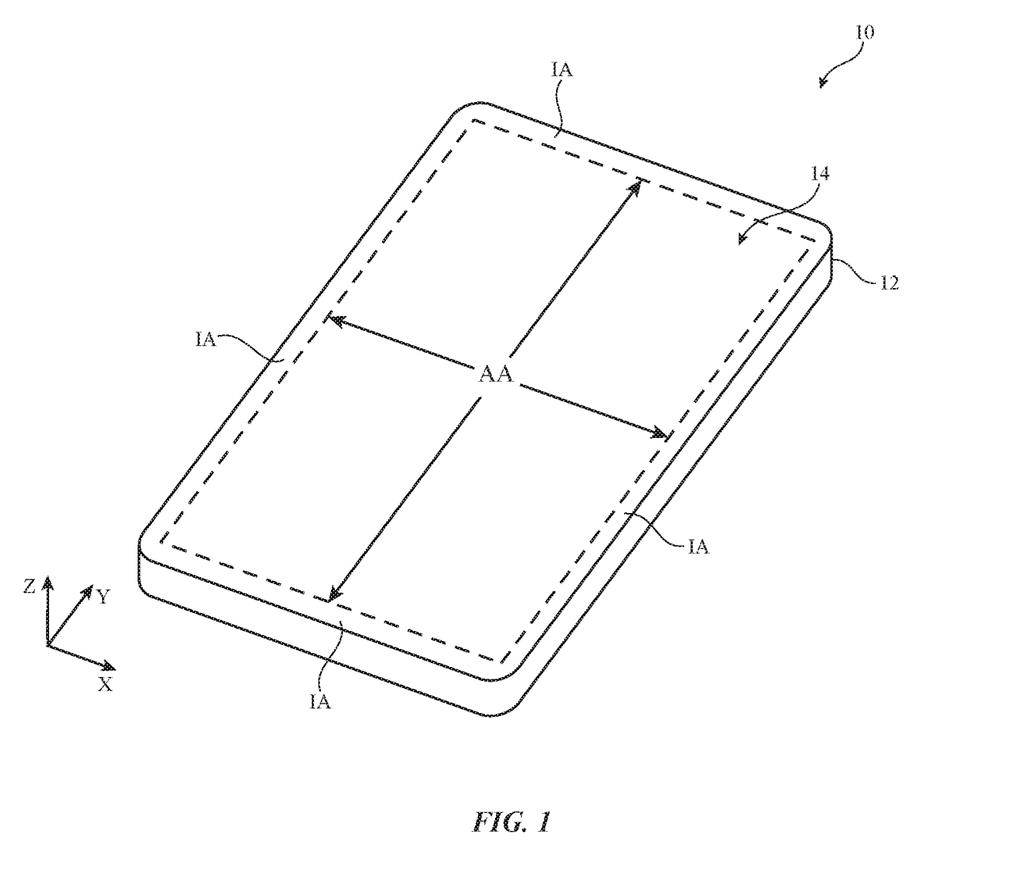
FIG. 1 is a perspective view of an illustrative electronic device in accordance with an embodiment.

An illustrative electronic device of the type that may have a backlit display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, wrist device, or other portable computing device. Other configurations may be used for device 10 if desired. The example of FIG. 1 is merely illustrative.

Device 10 may include a display such as display 14 mounted in housing 12. Housing 12, which may sometimes be referred to as an enclosure or case, may be formed of plastic, glass, ceramics, fiber composites, metal (e.g., stainless steel, aluminum, titanium, gold, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of pixels formed from liquid crystal display (LCD) components or other suitable pixels that are backlit with backlight illumination. The array of pixels may be located in active area AA and may be used in displaying images for a user. Inactive border regions such as inactive areas IA of FIG. 1 are free of pixels and do not display images for a user. Display 14 may have an outer layer such as a display cover layer that serves to protect display 14. The underside of the display cover layer in inactive area IA may be coated with an opaque masking material such as black ink to help hide internal components from view. To provide display 14 with an attractive appearance, it may be desirable to minimize the width of inactive areas IA along some or all of the borers of display 14. As an example, it may be desirable to minimize the widths of the inactive area IA along the left and right edges of display 14 (i.e., the edges of display 14 that run parallel to dimension Y in FIG. 1). In this type of configuration, speaker ports, button openings, and other structures may be located in the inactive areas IA at the upper and lower ends of display 14.

Figure 2:
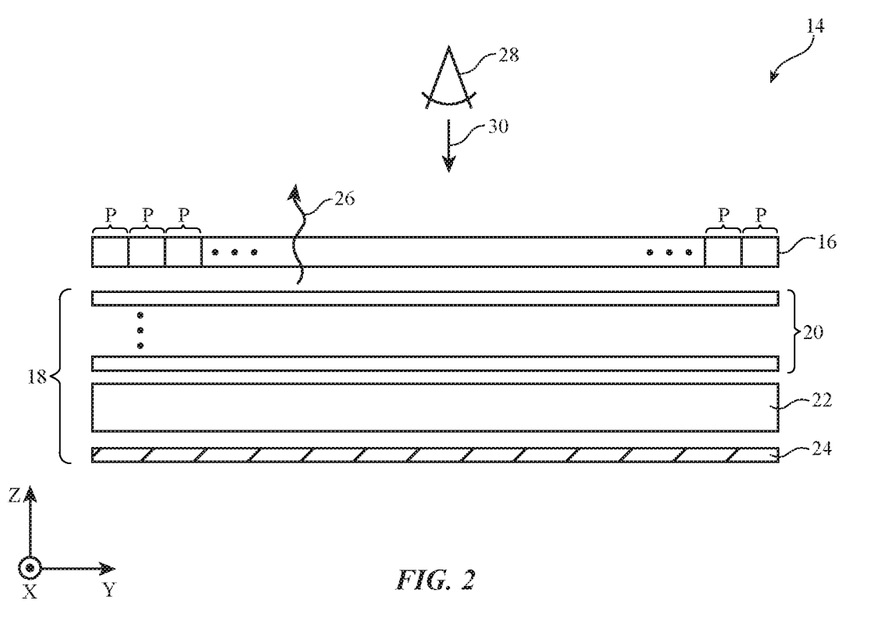
FIG. 2 is a cross-sectional side view of an illustrative display in accordance with an embodiment.

A cross-sectional side view of an illustrative backlit display is shown in FIG. 2. Display 14 of FIG. 2 may produce images for viewing in direction 30 by a viewer such as user 28. Display 14 may include backlight structures such as backlight unit 18 for producing backlight illumination 26. Pixels P may be formed in an array in a display module such as display module 16. Display module 16, which may sometimes be referred to as a display layer or a display, may be an electrophoretic display, a liquid crystal display, or other display that has an array of individually controlled light modulating pixels. With one illustrative configuration display module 16 may be a liquid crystal display module having upper and lower polarizers, layers such as a color filter layer and a thin-film transistor layer between the upper and lower polarizers, and a layer of liquid crystal material between the color filter layer and thin-film transistor layer. Pixel electrodes on the thin-film transistor layer may be used to apply electric fields to portions of the liquid crystal layer associated with pixels P and thereby control light transmission (i.e., transmission of backlight illumination 26) through layer 16. In general, display module 16 may be formed from any suitable backlit display panel with an array of pixels for presenting images to user 28. The use of a liquid crystal display arrangement for forming display 14 is merely illustrative.

Backlight unit 18 (sometimes referred to as a backlight) may include a light guide layer such as light guide layer 22. Light guide layer 22 may be a molded clear polymer light guide plate (e.g., a light guide layer formed from molded polymethylmethacrylate or other suitable polymer) or may be a thin flexible transparent polymer light guide film. The thickness of layer 22 may be 0.01 mm to 5 mm, may be less than 1 mm, less than 0.2 mm, less than 0.1 mm, less than 0.05 mm, more than 0.02 mm, or other suitable thickness. In active area AA, light guide layer 22 may have a planar shape (e.g., a shape that lies in the X-Y plane of FIG. 2). Light from one or more light-emitting diodes or other suitable light sources may be emitted into light guide layer 22 and may be distributed laterally (e.g., in dimensions X and Y in the example of FIG. 1) in accordance with the principal of total internal reflection.

The upper and/or lower surfaces of light guide layer 22 in the active area of display 14 may include light scattering features such as bumps, ridges, or other protrusions, pits, grooves, or other recesses, printed ink light scattering features, embedded light scattering structures such as bubbles or light-scattering particles, or other structures that help scatter light out of layer 22. Light that is scattered out of layer 22 and that travels upwards in direction Z may serve as backlight illumination 26. Reflector 24 may be located under light guide layer 22 and may be used to reflect light that has scattered downward out of layer 22 in direction −Z back in the upward direction (+Z) to serve as backlight illumination 26. Optical films 20 in backlight unit 18 may be interposed between light guide layer 22 and display module 16. Films 20 may include one or more layers such as a diffuser layer to homogenize backlight illumination 26, prism films for collimating backlight illumination 26, and compensation films for improving off-axis viewing performance. If desired, these films may be incorporated into other portions of display 14. For example, a compensation film may be incorporated into a polarizer layer in display module 16, etc.

Figure 3:
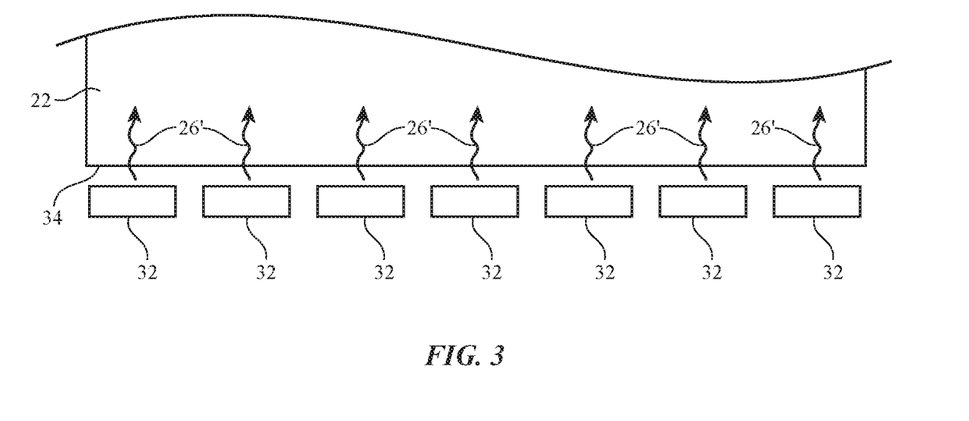
FIG. 3 is a diagram showing how a row of light-emitting diodes may emit light into an edge surface of a light guide layer in accordance with an embodiment.

A light source such as an array of one or more light-emitting diodes may be used in supplying light to the edge of light guide layer 22. The light-emitting diodes may be colored diodes and/or white diodes. In some configurations, different light-emitting diodes may have different colors, and/or display 14 may have white light-emitting diodes of different color temperatures (i.e., different light-emitting diodes may have different light emission spectra). In the example, of FIG. 3, an array of light-emitting diodes 32 is being used to emit light 26' into edge surface 34 of light guide layer 22. Light 26' is guided within light guide layer 22 by total internal reflection before being scattered out of light guide layer 22 by the light scattering features in layer 22 to serve as backlight illumination 26. Light-emitting diodes 32 may be white light diodes, may be a mixture of white light diodes of different color temperatures (e.g., some warm and some cold), and/or may include light of different colors (e.g., red, green, and blue light). The ratio of light produced by different colors (color temperature) light-emitting diodes may be used to adjust the color (color temperature) of backlight illumination 26. If desired, backlight 18 (e.g., light-emitting diodes 32, films in the layers of backlight 18, edge surfaces associated with these layers, etc.) may include photoluminescent materials to adjust backlight color (e.g., phosphors, quantum dot materials, etc.).

To help minimize the width of inactive area IA, light guide layer 22 may have an edge portion that is bent around a bend axis. Consider, as an example, light guide layer 22 of FIG. 4. Bent portion 22B (sometimes referred to as bent inactive area edge portion 22B or bent inactive border portion 22B) is bent about bend axis 22 with a bend radius R. The bent shape of portion 22B may have a smooth curved shape and its profile may form an arc of a circle or other smoothly bending shape. Bend axis 22 may run parallel to the edge of device 10 (i.e., along dimension Y in the example of FIG. 4, along dimension X, etc.). Bend radius R may be 0.1 to 10 mm, may be more than 0.5 mm, more than 1 mm, more than 2 mm, less than 4 mm, less than 3 mm, less than 2 mm, 0.5 to 3 mm, or other suitable amount. In general, bend radius R should not be too large so that space may be conserved within device 10 and should not be too small to avoid undesired light leakage.

Because of the bent shape of bent edge portion 22B of light guide layer 22, the width of active area IA (i.e., the width of area IA along dimension X of FIG. 4 in this example) may be minimized. If desired, housing portion 12' may overlap inactive area IA and may have a minimized width. In other configurations, the outermost layer of display 14 may extend over display 16 in active area AA and may extend over bent region 22B and other internal components in inactive area IA.

Components such as components 44 may be mounted in the interior of housing 12. Components 44 may include integrated circuits, connectors, and other electrical components. Components 44 may be mounted on substrates such as printed circuit board 42 and may, if desired, be received within region 46 in the interior of bent portion 22B (i.e., a region that is adjacent to the inner curved surface of bent portion 22B and that is at least partly surrounded by portion 22B). Allowing at least some of printed circuit 42 to extend between opposing upper and lower portions of bent edge portion 22 as shown in FIG. 4 may allow components to be efficiently mounted within device housing 12.

Figure 4:
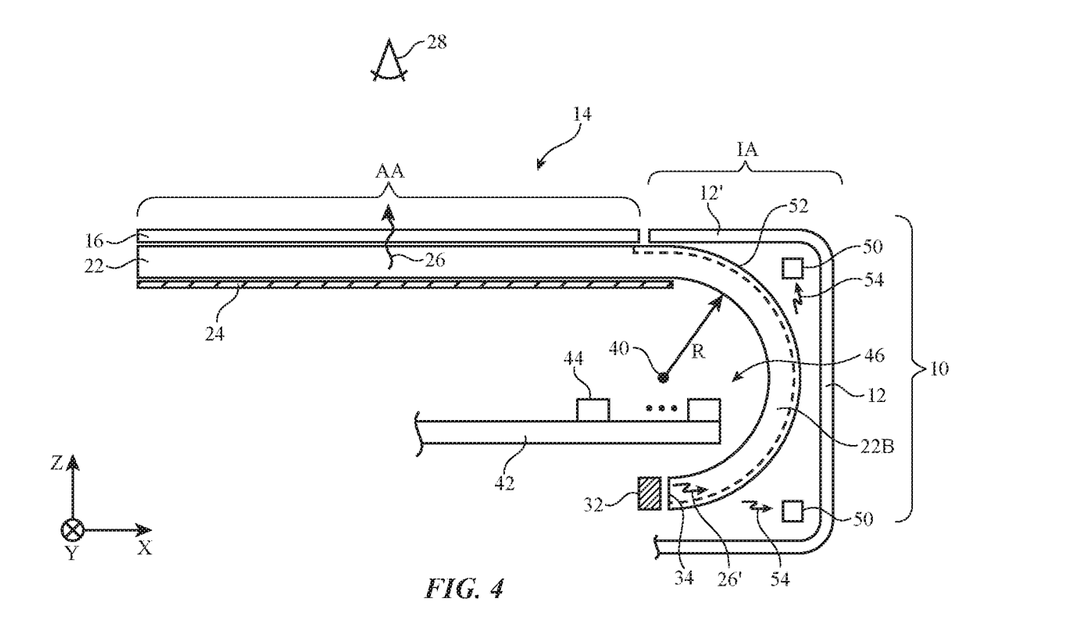
FIGS. 4 and 5 are cross-sectional side views of illustrative light guide layers with bent edge portions in accordance with an embodiment.

As shown in FIG. 4, electrical components such as components 50 may also be mounted adjacent to the opposing outer curved surface of bent portion 22B. During operation of backlight 18, some of light 26' such as light 54 may leak out of bent portion 22B (e.g., out of the curved outer surface of portion 22B). If desired, components 50 may be light detectors (e.g., photodiodes or groups of photodiodes) to measure the intensity and/or color of light 54. Control circuitry in device 10 may use these measurements to ensure that backlight 26 has a desired intensity and/or color. For example, light measurements from components 50 may be used to determine whether to increase or decrease the light output from light-emitting diodes 32 and whether to change the relative intensities of light-emitting diodes of different colors to adjust the color of backlight 26.

A reflective coating layer such as optional metal coating 52 may be formed on the outer surface (and, if desired, the inner surface) of bent portion 22B of light guide layer 22 to help minimize light leakage in bent portion 22B.

Figure 5:
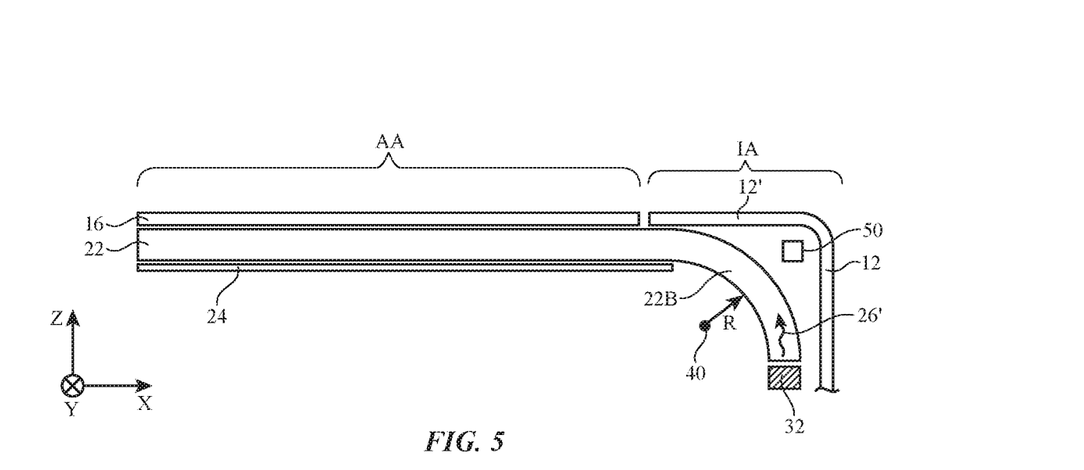

In the example of FIG. 4, bent portion 22B has a C shape and makes a 180° turn (i.e., light 26' is initially emitted from light-emitting diodes 32 in the X direction and, after passing through bent region 22 is distributed in the planar portion of light guide layer 22 in the −X direction. FIG. 5 shows how bent portion 22B may make a 90° bend rather than 180° bend. In this type of arrangement, light-emitting diode 32 emits light in upwards direction Z, at a right angle with respect to the direction in which the planar portion of light guide layer 22 extends (i.e., at a right angle with respect to the X and Y dimensions). Configurations in which light guide layer 22 is bent about bend axis 40 by more or less than 90° may also be used. As light from light-emitting diodes 32 passes through region 22B, the light becomes mixed (homogenized), which helps reduce backlight hotspots.

Figure 6:
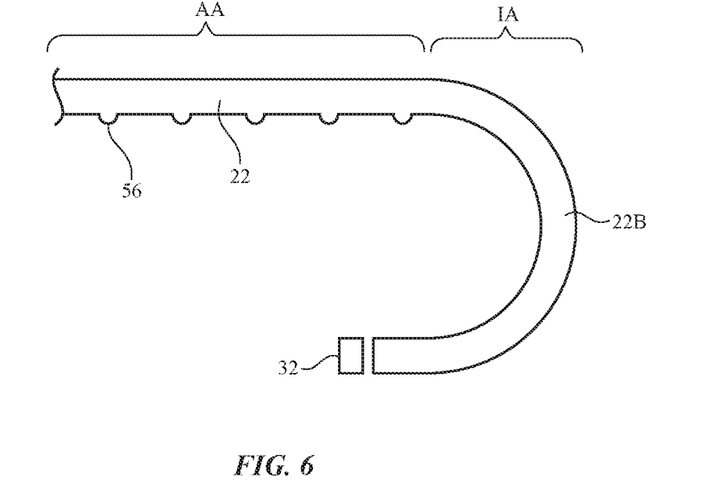
FIG. 6 is a cross-sectional side view of an illustrative light guide layer with a bent region that is free of light scattering structures and a planar portion that contains light scattering structures in accordance with an embodiment.

As shown in FIG. 6, light guide layer 22 may have light extraction features such as light scattering structures 56. In general, light guide layer 22 may have any suitable light scattering structures to help extract light from light guide layer 22. The light scattering structures may be pits, grooves, or other recesses, bumps, ridges, or other protrusions, printed patterns, embedded voids or particles, etc. These light scattering structures may be varied in density across the surface of layer 22 to help ensure that light 26 is evenly distributed across the surface of backlight 18. Light scattering structures may be formed on the upper and/or lower surfaces of light guide layer 22. Light scattering structures 56 may be provided on the planar portion of light guide layer 22 under the array of pixels P. To minimize light leakage in bent region 22B, region 22B may be free of light scattering structures 56.

Figure 7:
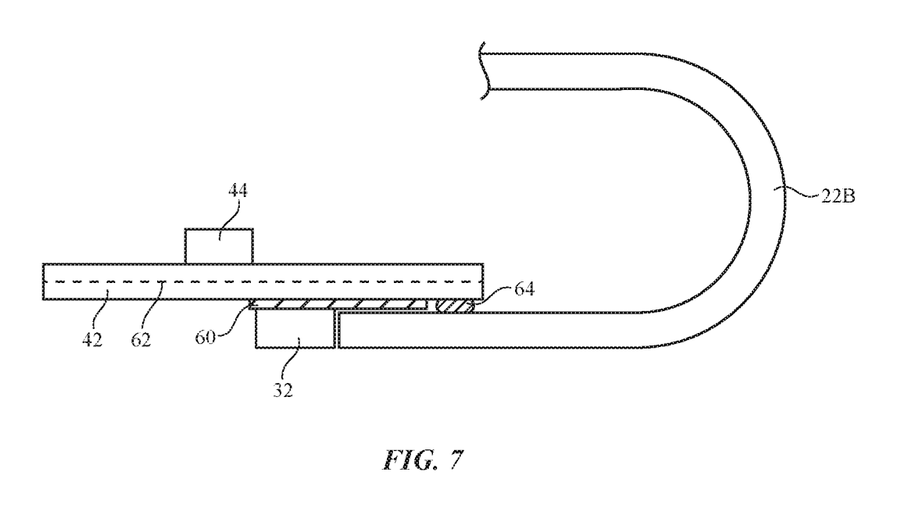
FIGS. 7 and 8 are cross-sectional side views of illustrative bent edge portions of light guide layers showing how light-emitting diodes may be mounted to emit light into the light guide layers in accordance with an embodiment.
Figure 8:
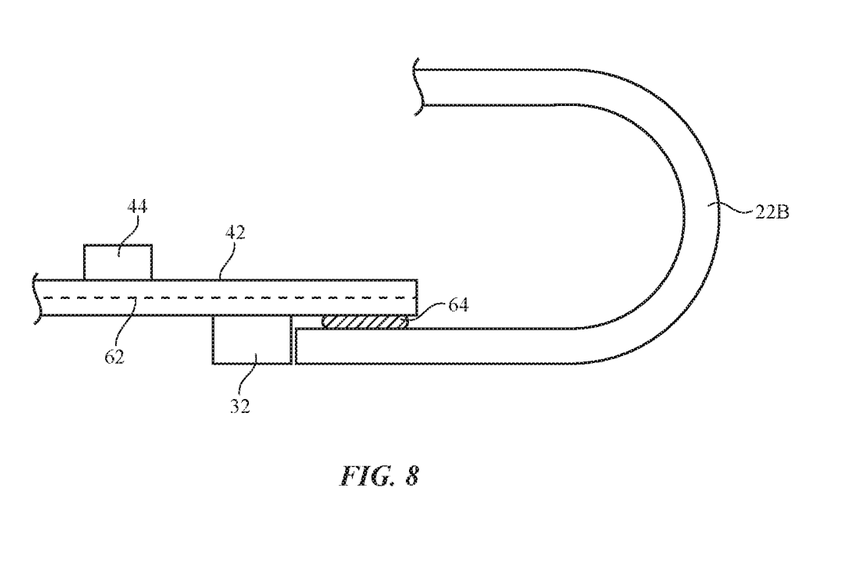

FIG. 7 shows how light-emitting diodes 32 may be mounted to substrates such as flexible printed circuit 60. Flexible printed circuit 60 may be formed from a sheet of polyimide or other flexible polymer layer. Flexible printed circuit 60 may be mounted to printed circuit board 42 (e.g., using solder, conductive adhesive, connectors, etc.). Components such as electrical component 44 may also be mounted to printed circuit board 42. With this type of a configuration, flexible printed circuit 60 may serve as a substrate for an array of light-emitting diodes 32. Light guide layer bent portion 22B may be attached to printed circuit 60 and/or printed circuit 42 using adhesive 64 (e.g., liquid adhesive, pressure sensitive adhesive, etc.). Metal traces in printed circuit 60 and/or in printed circuit 42 (see, e.g., metal traces 62) may help dissipate heat generated by light-emitting diodes 32. As shown in FIG. 8, flexible printed circuit 60 may be omitted. In this type of configuration, light-emitting diodes 32 may be mounted directly on printed circuit substrate 42 and adhesive 64 may be used to attach bent portion 22B of light guide layer 22 to printed circuit board 42.

Figure 9:
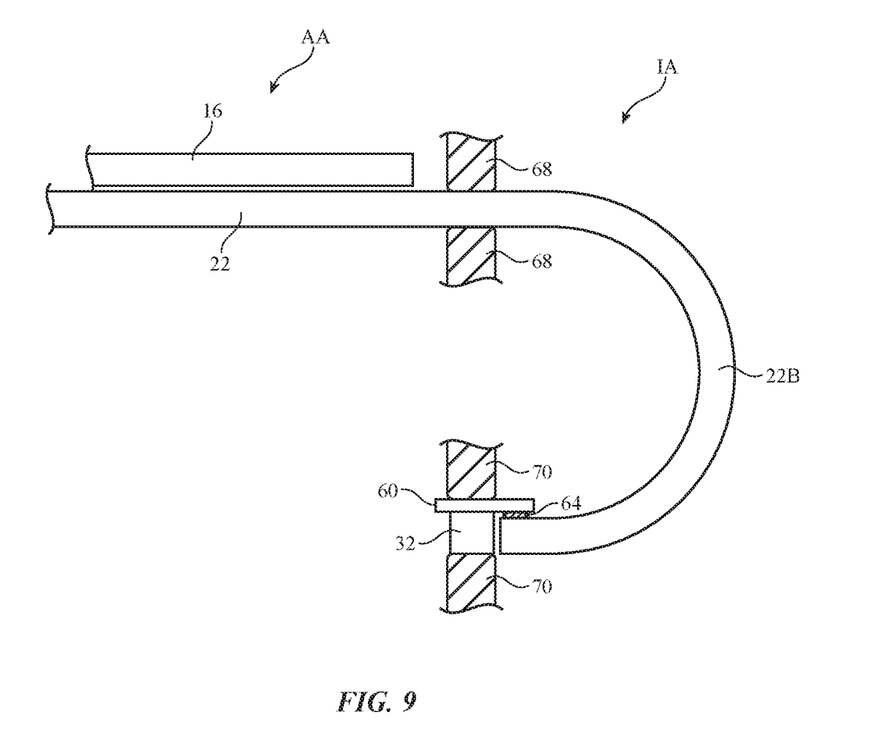
FIG. 9 is a cross-sectional side view of an illustrative light guide layer having a bent edge portion that has been secured using clamping structures in accordance with an embodiment.

If desired, clamps or other support structures may be used to support portions of backlight 18. As shown in FIG. 9, for example, backlight 18 may have clamping structures such as clamps 68 and 70. Clamps 68 and 70 may be formed from metal, plastic, or other suitable materials. Clamps 68 may be used to support the end of bent portion 22B adjacent to active area AA. Clamps 70 may be used to support printed circuit 60 (e.g., a flexible printed circuit or a rigid printed circuit) and light-emitting diode 32. With one illustrative arrangement, support structures such as clamps 70 (or at least the portion of clamps 70 that contacts light-emitting diode 32) may be formed from metal to help dissipate heat that is produced by light-emitting diode 32.

Figure 10:
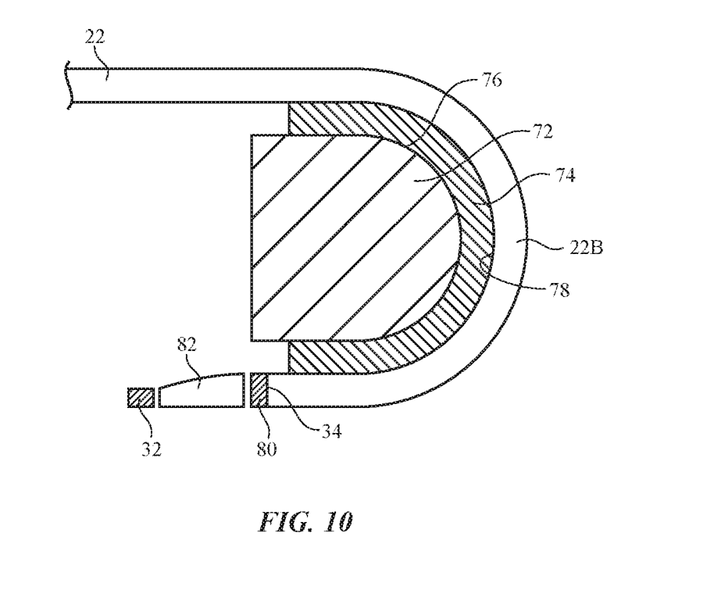
FIGS. 10 and 11 are cross-sectional side views of illustrative light guide layers with bent portions and associated structures with matching curved surfaces in accordance with embodiments.

As shown in the cross-sectional side view of FIG. 10, a support structure such as support structure 72 may be used to help support light guide layer 22 in bent portion 22B. Curved outer surface 76 of support member 72 may have a curvature that closely matches the curvature of curved inner surface 78 of bent portion 22B. A compressible material such as compressible layer 74 may be interposed between support structure 72 and bent portion 22B to help support bent portion 22B. Layer 74 may be formed from elastomeric polymer material such as silicon, elastomeric polymer foam, or other suitable material.

If desired, a light guiding element such as light guiding element 82 may be incorporated into backlight 18. Element 82 may include a lens, a light guiding structure (e.g., a light funnel), and/or other structures for distributing light from light-emitting diode(s) 32 to edge surface 34 of light guide layer 22. Edge surface 34 or other regions in backlight 18 may be coated with photoluminescent material 80 (e.g., phosphors, quantum dots, etc.) to create a desired color for backlight 26 (e.g., to create white backlight illumination from blue light emitted from one or more of light-emitting diodes 32, etc.). Light guiding element 82 and/or material 80 may be omitted, if desired.

Figure 11:
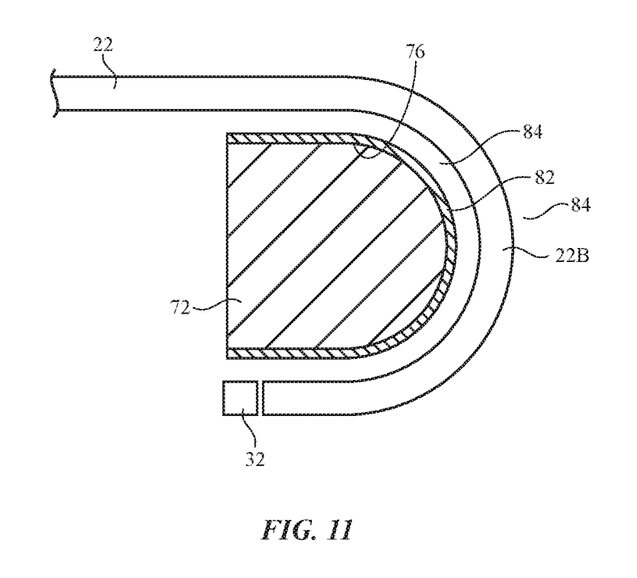

As shown in FIG. 11, curved outer surface 76 of structure 72 may be coated with a layer of reflective material such as coating 82. Coating 82 may be a layer of metal or other material that helps reflect light that has exited bent portion 22B of light guide layer 22 back into portion 22B (i.e., reflective coating 82 may help improve light recycling). Light confinement in portion 22B may be enhanced by ensuring that there is air 84 adjacent to the inner and/or outer surfaces of bent portion 22B. The refractive index of layer 22 may be, for example, about 1.5. Air has an index of refraction of 1.0, so ensuring that air 84 is adjacent to bent portion 22B of light guide plate 22 will enhance total internal reflection and thereby minimize light leakage.

Figure 12:
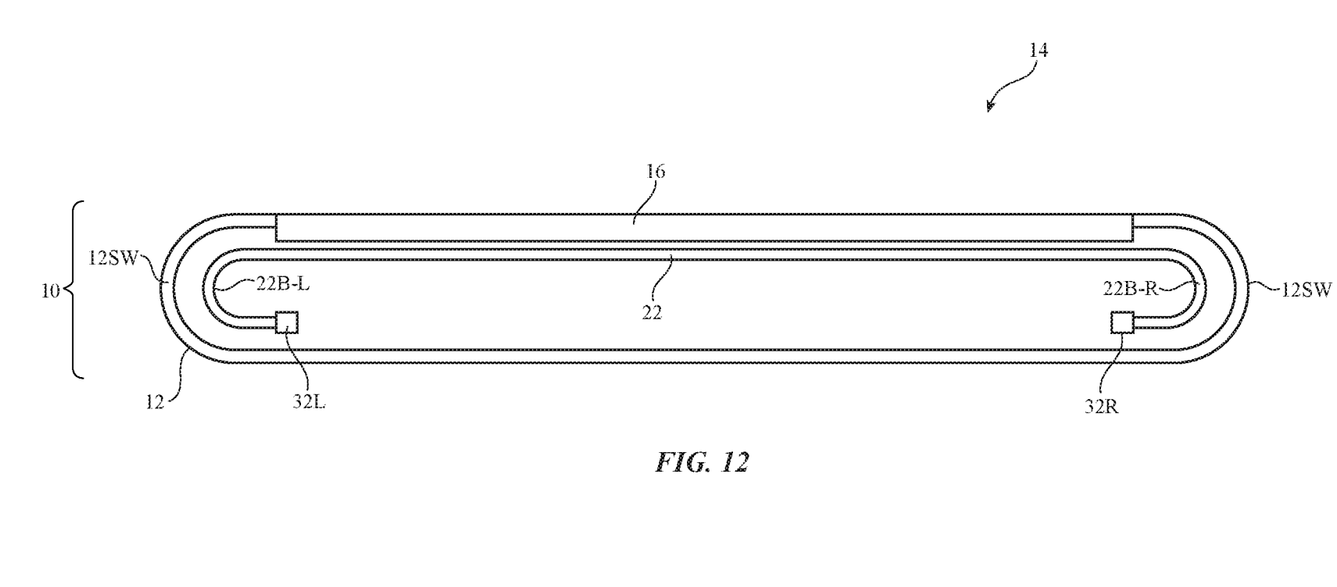
FIG. 12 is a cross-sectional view of an illustrative electronic device having a backlight with a light guide layer that receives light from light-emitting diodes located along two opposing light-guide layers in accordance with an embodiment.

If desired, light-emitting diodes 32 may be mounted along more than one edge of light guide layer 22. As shown in FIG. 12, light-emitting diodes 32L may supply light to bent portion 22B-L along the left edge of light guide layer 22 and light-emitting diodes 32R may supply light to bent portion 22B-R along the opposing right edge of light guide layer 22.

By supplying light to opposing sides of light guide layer 22, even and bright backlight illumination may be produced for display 14. If desired, housing 12 may have curved sidewalls 12SW that accommodate the curved shapes of bent portions 22B-L and 22B-R (i.e., sidewalls 12SW may have curved sidewall shapes that allow bent portions 22B-L and 22B-R to protrude outwardly to efficiently use the interior space available in housing 12 without striking the inner surface of housing 12 in a way that might create light leakage). Other shapes may be used for housing 12, if desired. The configuration of FIG. 12 is merely illustrative.

The foregoing is merely illustrative and various modifications can be made to the described embodiments. The foregoing embodiments may be implemented individually or in any combination.

What is claimed is:

1. A display, comprising:
    an array of liquid crystal display pixels;
    a backlight that supplies backlight illumination to the array of liquid crystal display pixels, wherein the backlight includes a light guide layer having first and second planar portions that are overlapped by the array of liquid crystal display pixels and a bent edge portion that extends between the first and second planar portions, wherein the first planar portion includes light-scattering structures, wherein the bent edge portion is free of light-scattering structures, wherein the backlight includes light-emitting diodes that are mounted on a printed circuit board and that emit light into an edge surface of the bent edge portion, and wherein the bent edge portion has a curved inner surface and an opposing curved outer surface;
    a metal coating on the curved outer surface of the bent edge portion of the light guide layer;
    a light detector adjacent to the bent edge portion that is configured to measure light leaking from the curved outer surface of the bent edge portion, wherein the metal coating is interposed between the bent edge portion and the light detector;
    a support structure with a curved surface, wherein the support structure is interposed between the first and second planar portions; and
    an elastomeric material interposed between the curved surface of the support structure and the curved inner surface of the bent edge portion.

2. The display defined in claim 1, the display further comprising a structure with a curved surface coated with metal adjacent to the curved inner surface of the bent edge portion.

3. The display defined in claim 1 wherein the bent edge portion has a C shape.

4. The display defined in claim 1 wherein the light-emitting diodes emit light in a direction and wherein the first and second planar portions extend along a dimension that is at a right angle to the direction.

5. An electronic device having an interior and an exterior, comprising:
    a housing having a front surface, a rear surface, and curved sidewalls that extend from the front surface to the rear surface, wherein the front surface, the rear surface, and the curved sidewalls separate the interior from the exterior, and wherein the front surface, the rear surface, and the curved sidewalls define a cavity;
    electrical components in the cavity;
    a display mounted in the housing that has an array of pixels and a backlight that supplies backlight illumination for the array of pixels, wherein the backlight includes a light guide layer with two bent edge portions on opposing edges of the light guide layer, wherein the bent edge portions each have an inner curved surface and an opposing outer curved surface, wherein the backlight includes a metal coating on the outer curved surface, and wherein the curved sidewalls accommodate the bent edge portions so that the outer curved surfaces do not contact the housing; and
    at least one light detector adjacent to at least one of the bent edge portions that is configured to measure light leaking from a curved surface of that bent edge portion, wherein the metal coating is interposed between the at least one of the bent edge portions and the light detector.

6. The electronic device defined in claim 5 wherein the backlight includes a plurality of light-emitting diodes with different emission spectra that emit light into edge surfaces of the two bent edge portions.

7. The electronic device defined in claim 6 further comprising light guiding elements that couple light from the light-emitting diodes into the edge surfaces.

8. The electronic device defined in claim 7 further comprising phosphor on the edge surfaces.

9. The electronic device defined in claim 5 further comprising:
    a substrate; and
    additional electrical components mounted on the substrate, wherein at least some of the substrate protrudes between portions of at least one of the bent edge portions.

10. The electronic device defined in claim 9 further comprising adhesive that attaches at least one of the bent edge portions to the substrate.

11. The electronic device defined in claim 5 wherein the light guide layer has a planar portion that is overlapped by the array of pixels, wherein the planar portion has light scattering structures that extract the backlight illumination from the planar portion, and wherein the bent edge portions of the light guide layer are free of light scattering structures.

12. An electronic device having an interior and an exterior, comprising:
    a housing having a sidewall, wherein the housing separates the interior from the exterior;
    a display mounted in the housing, the display comprising:
        an array of liquid crystal display pixels;
        a backlight that supplies backlight illumination for the array of liquid crystal display pixels, wherein the backlight includes a light guide layer having first and second planar portions that are overlapped by the array of liquid crystal display pixels and a bent edge portion having a curved inner surface and an opposing curved outer surface that extends between the first and second planar portions;
        a metal coating on the curved outer surface of the light guide layer;
        a light detector that measures light leakage from the curved outer surface, wherein the light detector is interposed between the curved outer surface and the sidewall and wherein the metal coating is interposed between the curved outer surface and the light detector; and
    a printed circuit board interposed between the first and second planar portions of the light guide layer.

13. The display defined in claim 12 wherein the backlight comprises light-emitting diodes that emit light into an edge surface of the bent edge portion.

14. The display defined in claim 13 wherein the light-emitting diodes are mounted to the printed circuit board and wherein adhesive attaches the bent edge portion to the printed circuit board.

15. The display defined in claim 14 further comprising:
a flexible printed circuit to which the light-emitting diodes are mounted, wherein the flexible printed circuit is coupled to the printed circuit board.

16. The display defined in claim 13 further comprising a metal support structure adjacent to the light-emitting diodes that dissipates heat from the light-emitting diodes.

17. The display defined in claim 1, wherein the elastomeric material is attached to the curved surface of the support structure and to the curved inner surface of the bent edge portion.

18. The electronic device defined in claim 5 wherein the front surface, the rear surface, and the curved sidewalls of the housing fully surround the cavity.

\* \* \* \* \*